(12) United States Patent
Kirwin

(10) Patent No.: US 11,907,983 B2
(45) Date of Patent: *Feb. 20, 2024

(54) SYSTEMS AND METHODS FOR PROOF OF APPLICATION OWNERSHIP

(71) Applicant: Stripe, Inc., South San Francisco, CA (US)

(72) Inventor: Joseph Patrick Kirwin, Victoria (CA)

(73) Assignee: STRIPE, INC., South San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/686,971

(22) Filed: Mar. 4, 2022

(65) Prior Publication Data
US 2022/0188888 A1    Jun. 16, 2022

Related U.S. Application Data

(63) Continuation of application No. 16/806,869, filed on Mar. 2, 2020, now Pat. No. 11,270,362.

(51) Int. Cl.
*G06Q 30/00* (2023.01)
*G06Q 30/0601* (2023.01)

(52) U.S. Cl.
CPC ..... *G06Q 30/0609* (2013.01); *G06Q 2220/00* (2013.01)

(58) Field of Classification Search
None
See application file for complete search history.

(56) References Cited

U.S. PATENT DOCUMENTS

2021/0089497 A1* 3/2021 Zhou ............... H04L 9/0637
2021/0117251 A1* 4/2021 Cristofi .............. G06F 9/542

* cited by examiner

Primary Examiner — Mila Airapetian
(74) Attorney, Agent, or Firm — Womble Bond Dickinson (US) LLP

(57) ABSTRACT

A method and apparatus for a commerce platform providing proof of application ownership of a network distributable application are described. The method may include receiving a request to approve an application developed by a merchant system, wherein the application includes an application programming interface (API) component, a software development kit (SDK) component, or a combination thereof provided by the commerce platform to the merchant system. The method may also include generating a unique identifier (ID) for the application to be included as metadata within the application. Furthermore, the method may include obtaining, from an application information system, data describing the application, and extracting an ID from metadata in the data obtained by the application information system. Then, the method may include that in response to determining that the ID extracted from the metadata matches the unique ID, associating the merchant with the application in a merchant account at the commerce platform and approving the application for interacting with the commerce platform.

20 Claims, 5 Drawing Sheets

SYSTEMS AND METHODS FOR PROOF OF APPLICATION OWNERSHIP

RELATED APPLICATIONS

This application is a continuation of U.S. patent application Ser. No. 16/806,869, filed Mar. 2, 2020, the disclosure of which is incorporated by reference herein in its entirety.

BACKGROUND

Merchants, such as grocers, car services, dry cleaning services, etc., provide their products and services to consumers. Such merchants often employ agents to deliver their products and/or provide the actual services. For example, a person acting on the merchant's behalf will drive a consumer in their own car, deliver food ordered through a merchant website, pick up and/or drop off clothes dry cleaned by the merchant, etc.

Typically, a merchant will organize their agents, and thus the provisioning of their services through the use of mobile applications (or apps). For example, a food delivery service may utilize an app to notify potential delivery drivers of delivery opportunities. As another example, a retail merchant may provide their employees with mobile payment devices having an app that can provide payment interfaces, collect payment information, and/or otherwise process transactions. Thus, such apps may handle sensitive customer information, and their integrity and security are very important to the customer, the merchant, and their agents.

The merchants, although distributing apps and providing a system for supplying products and/or services to consumers through their agents, often do not perform the financial processing associated with the merchant transactions. Instead, merchants utilize commerce systems and their software to process financial transactions for the products and/or services provided to consumers. This processing may include logic, such as application programming interfaces (APIs) and/or software development kits (SDKs), for generating checkout interfaces, running credit cards, crediting a merchant account for the transaction, crediting agents responsible for the transactions, debiting a commerce system fee for processing the transaction on behalf of the merchant, as well as performing other commerce related transactions for the merchant and/or agent such as providing payouts for products/services rendered on behalf of a merchant. Thus, the security and integrity of the merchant's app is of paramount importance to the system involved in payment processing services. The problems with ensuring app security and integrity are exacerbated by the problems of how to verify ownership and integrity of such apps as originating and/or belonging to a merchant, how to maintain such integrity where apps are distributed by online systems (e.g., app stores, app distribution platforms, etc.), and how to ensure later changes have not been made impacting app integrity.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
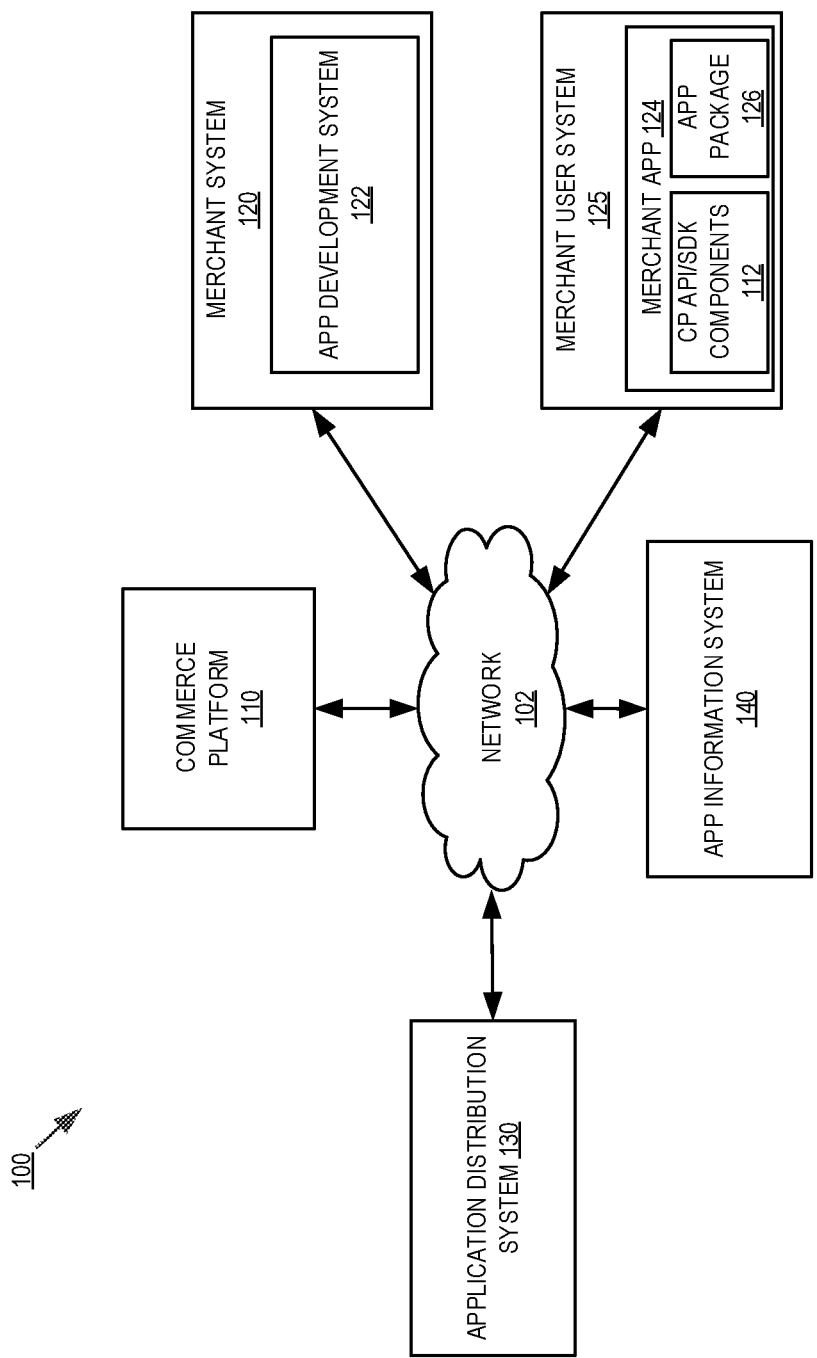
FIG. 1 is a block diagram of an exemplary system architecture for a commerce platform providing proof of application ownership of a network distributable application.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "generating", "obtaining", "extracting", "associating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a commerce platform 110 providing proof of application ownership of a network distributable application. In embodiments, the proof of app ownership is a verifiable proof that a merchant who is known to the commerce platform, and develops mobile (and non-mobile) application utilizing services of the commerce platform, is owned by and associated with the merchant, and is therefore provided with guarantees of trust when performing transactions using the commerce platform 110.

Although discussed in the context of the commerce platform 110 providing financial processing services to merchants (e.g., merchant system 120 and/or merchant user system 125), the embodiments discussed herein are not so limited. The embodiments for providing proof of ownership, and therefore checks on the integrity and trustability of mobile and non-mobile apps, may be used by any system who's logic is embedded into an application developed by another system that distributes that application using a network based distribution system, such as the GOOGLE PLAYSTORE™, APPLE APP STORE™, ROKU CHANNEL STORE™, GARMIN CONNECT IQ STORE™, and other online application distribution systems, as discussed in greater detail herein. That is, the techniques discussed herein may be used any system that wants to ensure applications developed by other parties, and which interact with the system, are controlled by the party developing the application and not a nefarious actor. However, to avoid obscuring the embodiments, the discussion below will be from the point of view of a commerce platform 110 providing for proof of app ownership for merchant system 120 developed apps distributed through an application distribution system 130 to merchant user system 125.

In one embodiment, the system 100 includes commerce platform 110, merchant system 120, merchant user system 125, application distribution system 130, and application information system 140 (e.g., an application information collection services, as discussed in greater detail below). The computer systems illustrated in FIG. 1 may also computing devices, such as one or more server computer systems, desktop computer systems, mobile computer systems, wearable computer systems, or a combination of different types of computing systems. One example of a computer system is discussed below and illustrated in FIG. 5.

The commerce platform 110, merchant system 120, merchant user system 125, application distribution system 130, and application information system 140 may be coupled to a network 102 and communicate with one another using any of the standard protocols for the exchange of information. In one embodiment, one or more of the commerce platform 110, merchant system 120, merchant user system 125, application distribution system 130, and application information system 140 may run on one Local Area Network (LAN) and may be incorporated into the same physical or logical system, or different physical or logical systems. Alternatively, the commerce platform 110, merchant system 120, merchant user system 125, application distribution system 130, and application information system 140 may reside on different LANs, wide area networks, cellular telephone networks, etc. that may be coupled together via the Internet but separated by firewalls, routers, and/or other network devices. In one embodiment, commerce platform 110, merchant system 120, application distribution system 130, and application information system 140 may each reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform 110 provides financial processing services to its users, which in the embodiments discussed herein include the merchant system 120, merchant user system 125, card brand systems (not shown), transaction clearing systems (not shown), and other systems. Merchant system 120 and merchant user system 125 would therefore, in embodiments, have established accounts with the commerce platform 110 that are associated with authentication credentials, encryption keys, banking information, etc. that commerce platform 110 may use to verify an identity of the merchant system 120 and/or a user of merchant user system 125. The financial processing services provided by commerce platform 110 may include collecting transaction information, collecting payment information, running and clearing transactions, performing chargebacks, providing refunds, paying out a user of the merchant user system 125 for services rendered on behalf of merchant system 120. To this end, in embodiments, commerce platform may distribute or make available software development kits (SDKs) and/or application programming interfaces (APIs) developed by the commerce platform 110 that the app development system 122 of the merchant system 120 may embed (e.g., CP API/SDK components 112) when developing merchant app 124. For example, the SDKs and/or APIs may present a set of libraries and/or functions that execute commerce platform processes, define communication protocols, generate network messages, etc. enabling the merchant app 124 to communicate with and utilize the services of commerce platform 110 for performing the financial transactions associated with merchant services. For example, the commerce platform 110 may perform one or more payment processing services for merchants, users of the merchant, etc. such as those provide by STRIPE™. To ensure that merchant app 124 is owned by merchant system 120 (e.g., a code base of the merchant app 124 is controlled by the merchant 120 and is therefore a trustworthy app), in embodiments discussed herein, the commerce platform 110 provides techniques and systems for ensuring proof of app ownership.

In embodiments, merchant system 120 develops applications using application development system 122, where the developed apps are uploaded to application distribution system 130 (e.g., an app store, marketplace, distribution channel, etc.). Merchant user system 125, as well as merchant system 120, may then download the app from the application distribution system 130, which is then installed and executed. When such app is developed using CP API/

SDK components 112, the app may interact with and/or perform transactions using the services of the commerce platform 110.

To ensure, however, that the merchant app 124 is legitimate and that merchant system 120 is in control of the code base associated with merchant app 124, in embodiments, commerce platform 110 initially verifies an identity of the merchant system 120, such as by verifying passwords, encryption keys, or other factors that establish the identify of merchant system 120 as an account holder with commerce platform 110. After merchant system's 120 identity is established, the commerce platform 110 receives from the app development system 122 an application identifier, such as an app name to be used when submitting a new app or new app version to the application distribution system. For example, a canonical app identifier, such as app.merchant.cp.ver123.com, which uniquely identifiers the app within the application distribution system, is received by the commerce platform 110. Other forms of identifiers, such as hash values, non-canonical identifiers, etc. may also serve to identify an app developed by merchant system 120. Commerce platform 110 then stores an association between the received app identifier and the merchant.

After receiving the app identifier from merchant system 120, commerce platform 110 generates a unique ID for the app, and associates the unique ID with the app name provided by the merchant system 120. The unique ID, in embodiments is a nonce, such as a random 16, 32, 64, etc. bit number generated by the commerce platform. In embodiments, other identifiers, such as hashes generated from the app name may be used. However, in other embodiments, a cryptographic nonce is used to ensure independent of the unique ID and the app's name and content.

Furthermore, in embodiments, the unique ID may be embedded in a snippet of code generated by commerce platform 110, such as a metadata code field for inclusion in one or more locations of an application package (e.g., a manifest file of the application package), where the application package (e.g. app package 126) describes the app's contents prior to the app being uploaded/checked-in to the app distribution system 130. In embodiments, the app is provided with the application package (e.g., app package 126) for use by an operating system for the distribution, installation, running, etc. of the app. In one embodiment, the app package 126 may be an ANDROID™ package (APK) file. Such app packages generally include elements such as a name (e.g., the unique name discussed above), certificate(s), hash trees for verifying app package and app integrity, a directory of app contents, compiled code, a manifest file (e.g., an additional file in XML or other format describing the name, version, access rights, referenced libraries such as the CP API/SDKs, metadata elements, etc.), listing of compiled classes, precompiled resource listing, etc. Essentially, the app package 126 describes the app so that an app store, operating systems, etc. knows the app's contents, and other systems know how to install and run the app. In one embodiment, the snippet of code is a name value pair using the unique ID generated by the commerce platform 110 as the value (e.g., <meta-data: unique ID==1234567890>), and is added to the manifest file in the app package prior to uploading the app to application distribution system 130. In embodiments, the name, value pair may be added to alternative fields and/or application elements.

Commerce platform 110 then marks the app associated with the app name, for example in a merchant data store at the commerce platform 110, as not yet approved (e.g., a verification has not yet been completed). The lack of approval for the app associated with the app name/merchant, enables commerce platform 110 to prevent the app from interacting with the commerce platform 110. That is, any app attempting to run a transaction for the merchant system, and having the name of an unapproved app bound to the merchant, can be prevented by the commerce platform 110 from conducting transactions based on the app status. The binding of app name, approval status, and merchant is discussed below, and ensures that only specific apps approved for specific merchants are trusted and enabled to run transactions using the services of the commerce platform 110.

After the app with the app package having the unique ID, value pair added to the app package (e.g., in a metadata field of an app manifest file), is uploaded by merchant system 120 to application distributions system 130, application distribution system 130 will check-in the app. Such checking-in can include verifying the app and its components (e.g., perform integrity checks, formatting checks, app package checks, etc.), adding and/or verifying integrity information (e.g., adding and/or checking hash values, trees of chained hash values, etc. that serve to verify integrity of content in the app package), and upon completion of these tasks, makes the application available for download. For example, once checked in, merchant user system 125 may download the merchant app 125 from the application distribution system 130. Even though it is available for download, however, commerce platform 110 has not yet approved the app for use with the commerce platform 110.

In embodiments, commerce platform therefore generates one or more queries to application information system 140. In embodiments, application information system 140 is a third party system or part of commerce platform, and is responsible for culling new app information from application distribution system 130. That is, for each new app checked into application distribution system 130 which is downloadable, app information system 140 obtains the application package for the apps (e.g., app package 126 of merchant app 124). Thus, in response to a query providing one or more app names (e.g., names of apps received from merchant systems associated with new/revised apps, such as the app associated with the name==app.merchant.cp.ver123.com), application information system 140 will respond by providing the app package associated with the named app as available on the application distribution system 130.

In embodiments, when commerce platform 110 receives the app package (e.g., app package 126), commerce platform 110 extracts the unique ID from app package. For example, the unique ID may be extracted from a metadata field in the app's manifest file. Continuing the example, the commerce platform 110 extracts the name, value pair (e.g., unique ID==1234567890) from the manifest file and compares the extracted unique ID from the unique ID associated with the merchant by app name. When there is a match, the app name is marked as approved in the merchant's account data, and thereafter cleared for use. The approval, however, is associated with the merchant thereafter binding the app approval to the merchant. As such, other merchants/users would not be able to use the app for their transactions until they too complete the approval process. Thus, merchant app 125 being associated with merchant system 120 and having the app package 126 with the appropriate metadata would be able to use CP API/SDK components 112 to interact with commerce platform 110 to perform various transactions.

Beneficially, the application is provided with guarantees of trust, as the ownership of the code base of the app is confirmed by the generation, distribution, and verification of the unique ID generated by the commerce platform 110 and embedded within the application (e.g., within metadata of a manifest file). Furthermore, the app package 126 from which the unique ID is obtained is typically associated with its own guarantees of trust. That is, upon checking in a new app (or new version of an existing app), the app will be provided with or associated with hash values, chained hash values, etc. generated from app content. These hash values enable the verification of content of the app. Thus, when the unique ID is available from the checked-in app, and the checked-in app's content can be verified, then commerce platform 110 is able to verify that the app is indeed the app associated with the merchant system 120, and should be trusted when used by merchant user system 125.

Figure 2:
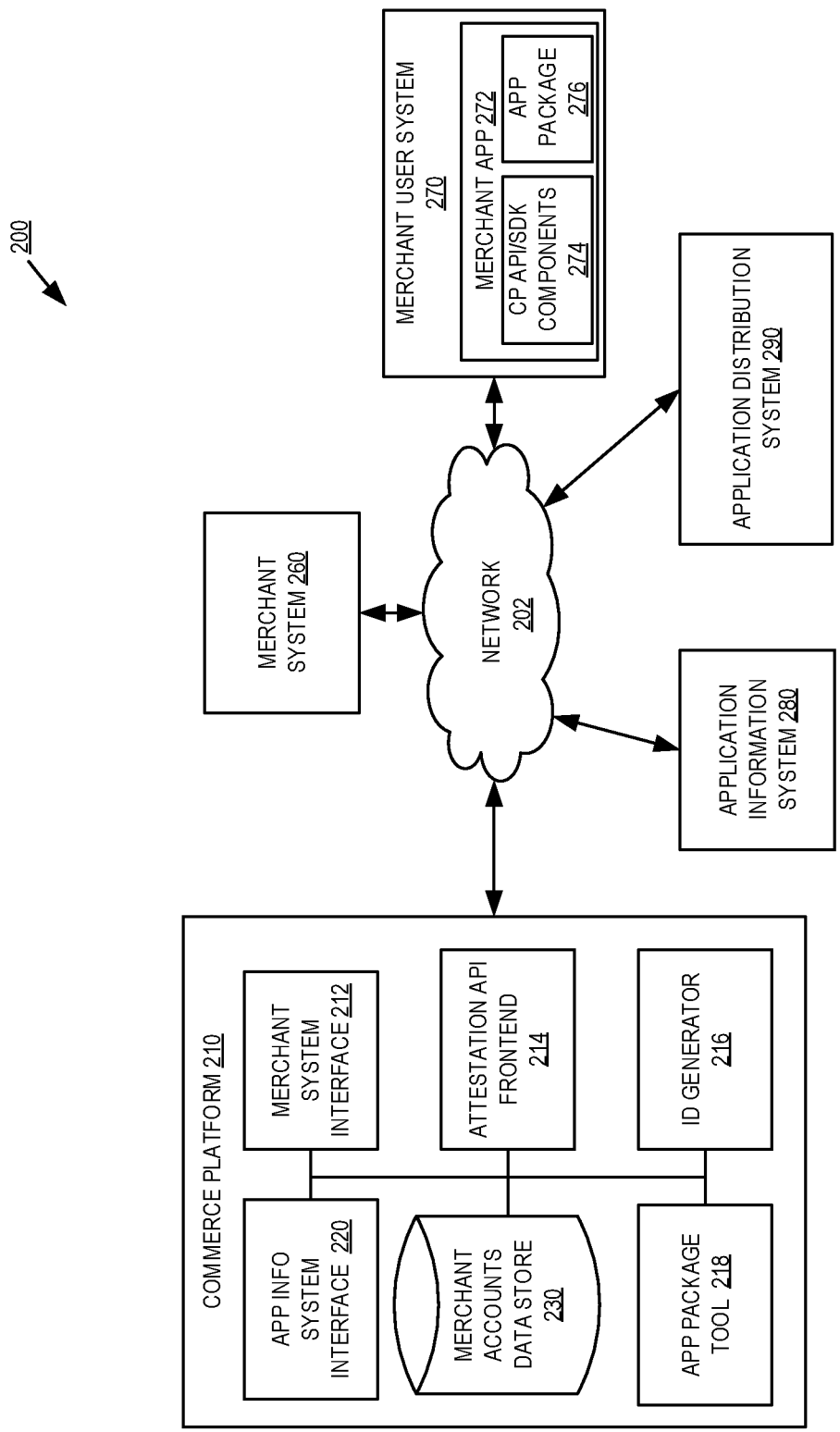
FIG. 2 is a block diagram of one embodiment of a commerce platform that provides proof of app ownership of a network distributable application.

FIG. 2 is a block diagram of one embodiment 200 of a commerce platform 210 that provides proof of app ownership of a network distributable application. Commerce platform 210 may utilize the services of app information system 280 to verify guarantees of trust in a merchant app 272 controlled by merchant system 260 and distributed by application distribution system 290. Commerce platform 210, app information system 280, merchant system 260, merchant user system 270, and application distribution system 290 provide additional details for the corresponding devices/systems discussed above in FIG. 1.

In one embodiment, commerce platform 210 includes a merchant system interface 212, an attestation API frontend 214, an ID generator 216, an app package tool 218, an app info system interface 220, and a merchant accounts data store 230. These components may perform the functions discussed herein utilizing software, hardware, firmware, or a combination thereof.

Merchant system interface 212 provides an interface by which merchant system 260, which is developing an app (e.g., merchant app 272), may confirm their identity. For example, merchant system 260 may have an existing account with commerce platform 210, and verification information (e.g., passwords, encryption keys, etc.) are stored in the account associated with the merchant in merchant accounts data store 230. Thus, merchant system 260 may interface with the commerce platform 210 via the interface 212 to establish their identity as an account holder with the commerce platform 210.

After merchant system interface 212 confirms a merchant's identity and account, attestation API frontend 214 receives a request from the merchant system 260. In embodiments, the request specifies an application name (e.g., a canonical and/or other unique ID to be given to an app that will utilizes commerce platform 210 APIs/SDKs). For example, the merchant system 260 may specify to the attestation API frontend the app's name 'name==app.merchant.cp.ver123.com', along with a request for a unique ID to be embedded in the named app's app package, as discussed herein. ID generator 216 then generates a globally unique ID, such as a cryptographic nonce value, which is provided to the attestation API frontend 214 and which is stored in the merchant accounts data store 230 in association with the app's name (e.g., app.merchant.cp.ver123.com is associated with the generated unique ID). The attestation API frontend 214, in embodiments, may further generate a code snippet including the unique ID to be embedded within an app package for the named app. For example, the snippet may be a snippet for inclusion as a metadata field within an application manifest file within the app package (e.g., <meta-data: unique ID==1234567890>). Attestation API frontend 214 then returns the code snippet to the merchant system for pasting into the manifest file within the app package for the named app. In another embodiment, however, only the unique ID is returned to the merchant system 260 who is responsible for coding and embedding the unique ID within the app package.

In either embodiment, the merchant app being developed and having the unique ID embedded within an app package for the app is uploaded to, and checked in by, the application distribution system 290. As discussed herein, the application distributions system is an online marketplace, store, channel, etc. that distributes apps to systems over network 202. Once application distributions system 290 receives a new app, it will perform its own integrity verifications (e.g., virus checking, format checking, hash verification(s)/generation(s), etc.) before making the app available for download, such as before making merchant app 272 available for download by merchant user system 270. As illustrated, the merchant app 272 includes the commerce platform API/SDK components 274 for interacting with the commerce platform 210. Thus, the unique ID in the app package 276 is to be verified by the commerce platform 210 before approving the merchant app 272.

In embodiments, to approve merchant app 272 for interacting with commerce platform 210, app info system interface 220 of commerce platform 210 queries app information system 280 on a regular basis (e.g., daily, hourly, a certain amount of time after app ID requests, etc.). In embodiments, the request includes the names of apps for which approval has not yet been given. For example, the app named 'capp.merchant.cp.ver123.com' associated with merchant system 260 has had a unique ID generated for it, and has been checked into application distributions system 290, but has not yet been approved. As discussed above, app information system 280 culls application distribution system 290 for newly checked-in apps, and when one is found obtains the application packages for such apps. Thus, app info system interface's 220 query by app name to app information system 280 will receive an app package associated with the app name (e.g., app package 276), when the app package is available. It may take time (e.g., hours, days, etc.) for application distribution system 290 to check in an app based on the processes performed by the application distribution system 290, and thus app info system interface 220 may make one or more queries for the merchant's unapproved app, as necessary.

App info system interface 220 provides the obtained app packages to app package tool 218. In embodiments, app package tool 218 is configured to analyze and extract data from app packages. For example, app package tool 218 may determine integrity of app contents based on hash values within an app package (e.g., to detect whether app content has been altered). Furthermore, app package tool 218 may parse and extract content of an app package to locate and obtain a unique ID from the app package. For example, the app package tool 218 may locate metadata fields within an app package's manifest file, and extract the <meta-data: unique ID==1234567890> field to obtain the value of the unique ID.

In embodiments, the extracted ID is provided to the attestation API frontend 214 that checks the extracted ID against the unique ID stored in merchant accounts data store 230. When there is a match, the app (e.g., merchant app 272) associated with the merchant (e.g., merchant system 260) and the app name (e.g., 'name==app.merchant.cp.ver123.com') is approved. A record for the merchant noting the approval of the app may then be stored in merchant accounts data store 230, thereby enabling the association of trust in the app and guaranteeing merchant control over the codebase of the app.

Furthermore, a fine grained approval process is provided as app approval binds specific merchants with specific apps being approved. That is, an app approval applies to the merchant making the approval request, and not other merchants/systems that may use the app. As such, commerce platform 210 is able to check that the merchant developing and using the app is the actual party in charge of the app, which results in improved security for the app users (e.g. a user of merchant user system) and the merchant's customers, the merchant system, the commerce platform 210, and other systems (e.g., banking systems, card brand systems, etc.).

Figure 3:
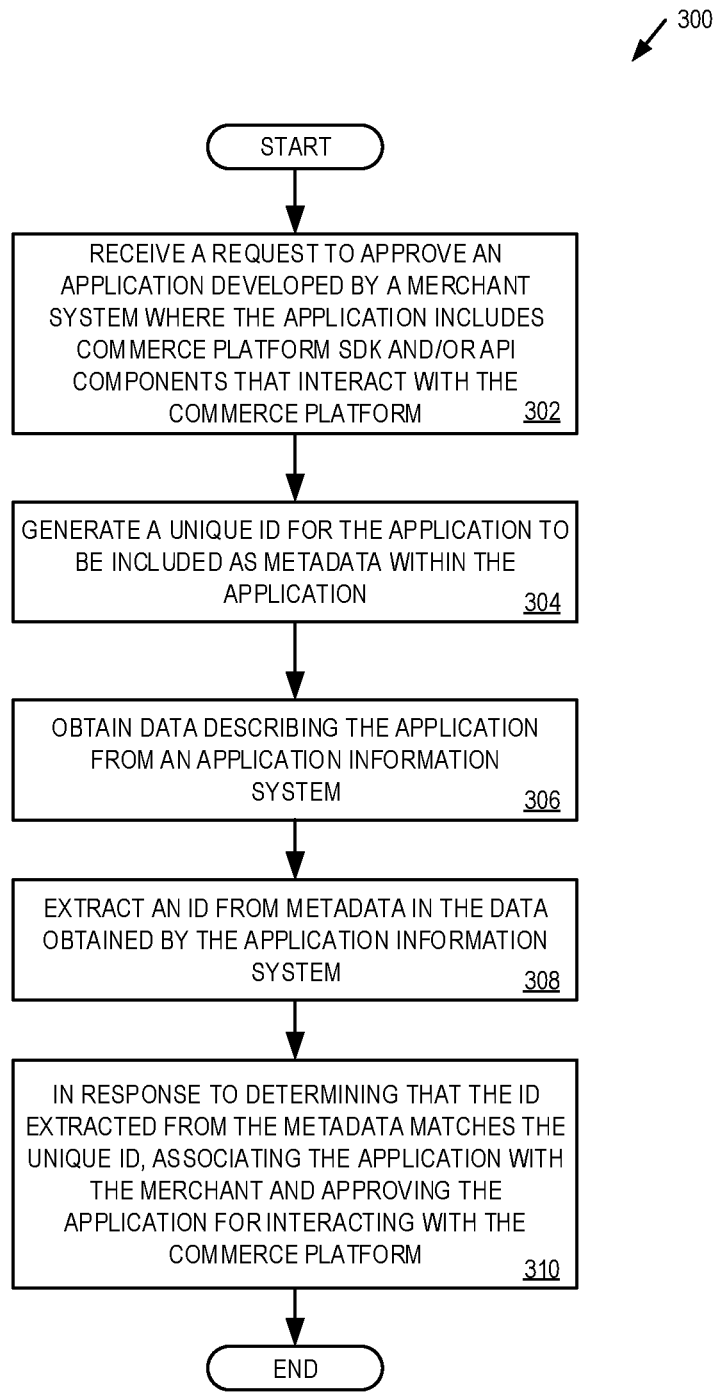
FIG. 3 is a flow diagram of one embodiment of a method for providing proof of app ownership of a network distributable application by a commerce platform.

FIG. 3 is a flow diagram of one embodiment of a method 300 for providing proof of app ownership of a network distributable application by a commerce platform. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform (e.g., commerce platform 110 or 210).

Referring to FIG. 3, processing logic begins by receiving a request to approve an application developed by a merchant system where the application includes commerce platform SDK and/or API components that interact with the commerce platform (processing block 302). As discussed herein, the commerce platform may distribute functions, libraries, protocols, etc. embodied in SDKs and/or APIs that enable merchant apps to perform transactions using the commerce platform. Thus, in embodiments, before commerce platform enables a merchant application to have such interactions (e.g., during a transaction conducted by a merchant system with their customer to, for example, collect financial information, clear a payment method, report transaction success, etc.), processing logic of the commerce platform first ensures the merchant associated with the application is the owner of the application (e.g., controls the code base of the app). In embodiments, the request includes a name of the application, such as a unique name (e.g. a canonical app identifier) given to the application and used by the merchant when uploading the application to a distribution system. Furthermore, the application may be a mobile application, also referred to as an app.

In response to the request, processing logic generates a unique identifier (ID) for the application to be included as metadata within the application (processing block 304). In one embodiment, the unique ID is to be included in an application's manifest file. The manifest file is a file within an application package for the application that describes the name, version, access rights, referenced library files, etc. and enables metadata such as name, value pairs to be included in the manifest. Furthermore, the manifest file is part of an application package containing the complied code, directories of resources, etc. for the application enabling the application to be installed and run on systems. In embodiments, the unique ID is a cryptographic nonce, such as a 16-bit, 32-bit, 64-bit, etc. nonce value. Although other unique IDs may be used consistent with the discussion herein, the cryptographic nonce is a random number generated by processing logic that is not tied to the content of the app, and thus cannot be recreated by a party that may know of the app's contents. In embodiments, the unique ID is associated with the application's name in an account for the merchant seeking to get commerce platform approval of the new/updated application.

Processing logic then obtains data describing the application from an application information system (processing block 306). In embodiments, the application information system is a third party system or part of the commerce platform, that culls new app information from application distribution systems. Such new app information can include, for example, app packages for the apps available on the application distributions system. As discussed herein, the application packages will typically include the application manifest file, and the application packages will have unique names at the application distributions systems. Thus, the application packages culled from such system will also have those unique distribution system names, and consequently processing logic can request specific application packages (e.g., app packages that merchants are seeking to have approved) from the application information system based on the application names provided by the merchant.

Processing logic extracts an ID from metadata in the data obtained by the application information system (processing block 308). In embodiments, processing logic parses an application's manifest file within the application package to locate metadata fields within the manifest file. Then, from found metadata fields, processing logic can obtain the unique ID, value pair for the named app (e.g. the app package requested by name from the application information system).

In response to determining that the ID extracted from the metadata matches the unique ID, processing logic associates the application with the merchant and approves the app for interacting with the commerce platform (processing block 310). In embodiments, the unique ID will be stored in a merchant data store and associated with the merchant that is seeking to get their app approved. Thus, the extracted ID is matched by processing logic against the application name and unique ID value to determine whether the app package has the unique ID embedded within. When it does, processing logic is able to determine that the original merchant making the request is the party who has control over the application (e.g. they checked it into the app distribution system). Furthermore, the commerce platform is able to leverage its existing relationship with the merchant as a source of trust in the merchant and the verified app. Additionally, the commerce platform is able to leverage the security measures provided by the app distribution system (e.g., hashes of content for checked in app packages, virus scanning, etc.), as another source of trust in the app. When combined, the commerce platform can trust the merchant is the owner of the application and the content of the application has not been tampered with after download from the distribution system.

Figure 4:
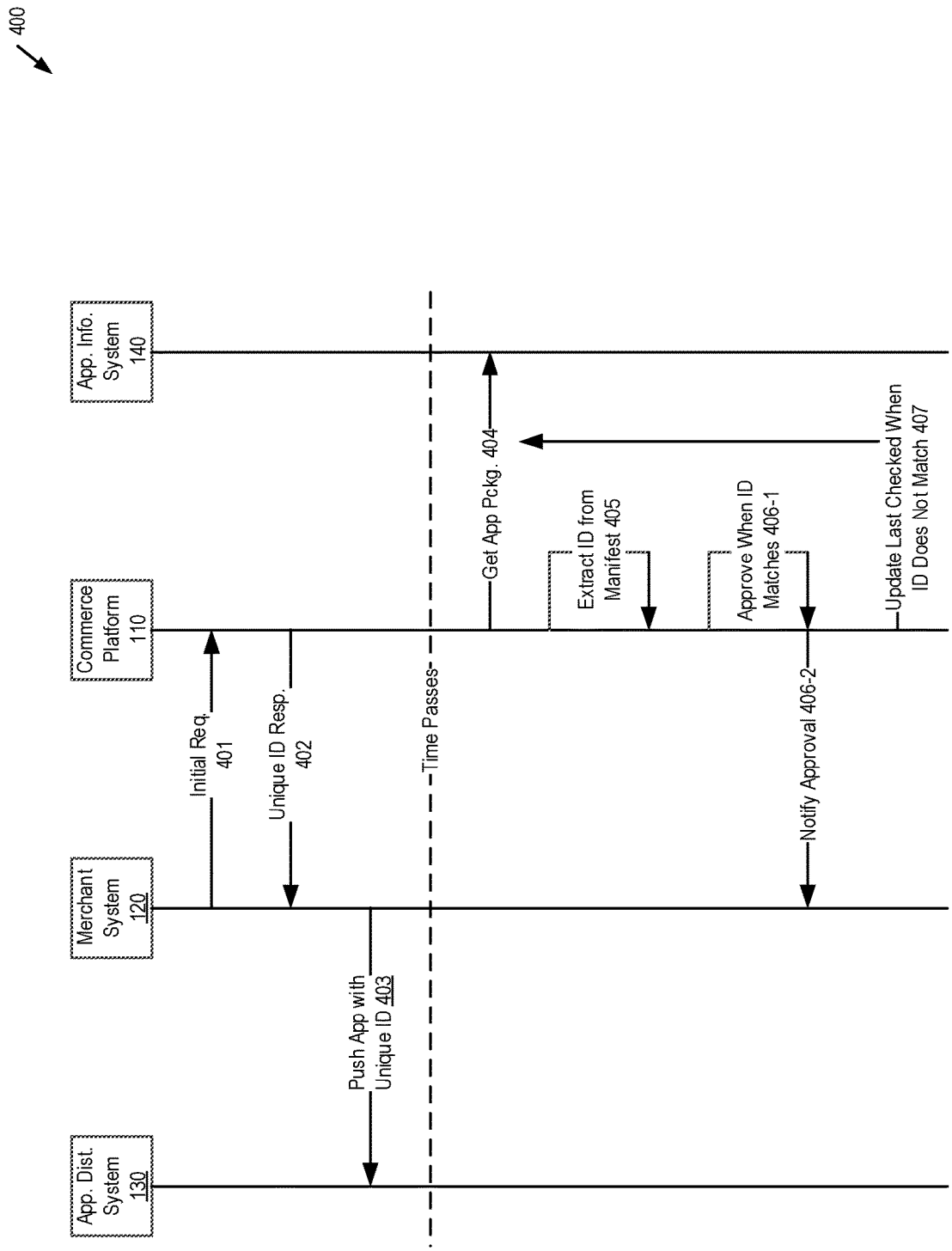
FIG. 4 is a network communications diagram including an app distribution system, a merchant system, a commerce platform, and an app information system when providing proof of app ownership of a network distributable application by a commerce platform.

FIG. 4 is a network communications diagram 400 including an app distribution system 130, a merchant system 120, a commerce platform 110, and an app information system 140 when providing proof of app ownership of a network distributable application by a commerce platform.

Merchant system 120 generates and transmits an initial request 401 message to the commerce platform. The initial request, as discussed herein, may include an app identifier of an app the merchant system 120 seeks to get approved for interacting with the commerce platform. The app identifier may be a unique name given to an app and used to identify the app within an application distribution system. In embodiments, a frontend of the commerce platform 110 may receive the request, and further verifies the merchant system 120 as having an existing account at the commerce platform.

Commerce platform 110 responds with a unique ID 402. The unique ID may be a cryptographic nonce, which is a random number generated by the commerce platform independent of the application and merchant. Furthermore, commerce platform 110 may embed the unique ID in a snippet of metadata code to be pasted into a manifest file for an application package for the application sought to be approved. The merchant system 120 then pushes the app with the unique ID to the application distribution system 403. In embodiments, the unique ID is embedded in a metadata field in an app package manifest file, as discussed herein.

Time then passes as the app distribution system 130 performs operations to check in the file, such as determining if the file contains viruses or other nefarious code, whether the app package is in the proper format and include the proper components (e.g., includes the required manifests, libraries, directories, content hashes matching the included content, etc.). When the app package does, the app distribution system 130 may sign the app package, and enable the downloading of the app package from the distribution system 130.

Commerce platform 110 then gets the app package 404 from an application information system 140. As discussed herein, the application information system 140 is a third party service or a service of the commerce platform that can cull new app packages from the app distribution system, and which makes the app packages available to other systems. Thus, the commerce platform getting the app package 404 can include the commerce platform requesting an app package by the application's name or app identifier (e.g., the name/app identifier received in the initial request 401).

The commerce platform may then extract the ID from the app package's manifest 405, such as extracting a name, value pair corresponding to the unique ID=value pair stored in an XML manifest file within the app package. When the extracted ID matches the unique ID generated at 402, such as by matching the extracted ID with a unique ID stored in merchant system's 120 account at the commerce platform for the named application, commerce platform approves the app 406-1 and notifies 406-2 the merchant system 120 of the approval. In embodiments, a record, such as {app package name, version, hashes, etc.} are stored and associated with the merchant system's 120 account to bind the merchant to the app version just approved. Then, merchant systems are able to use the app (e.g., a merchant user system can perform services/sales for the merchant system through the mobile app).

When the ID does not match, the commerce platform 110 can update 407 "last checked" data indicating that the ID was not matched as of a certain time, and return to again get the app package from the app information system. In embodiments, commerce platform 110 may notify merchant system 120 when no ID match is detected within a certain amount of time.

In the embodiments, discussed herein, the commerce platform providing for proof of app ownership enables the commerce platform to improve trust in applications distributed through app stores, marketplaces, distribution channels, etc. Furthermore, the proof of app ownership is obtained independent of the distribution systems, and is granular to the level of specific merchants being approved and associated with specific apps. Beneficially, security is improved for merchant customers, merchants, the commerce platform, and other system during transactions using the services of the commerce platform, as discussed above.

Figure 5:
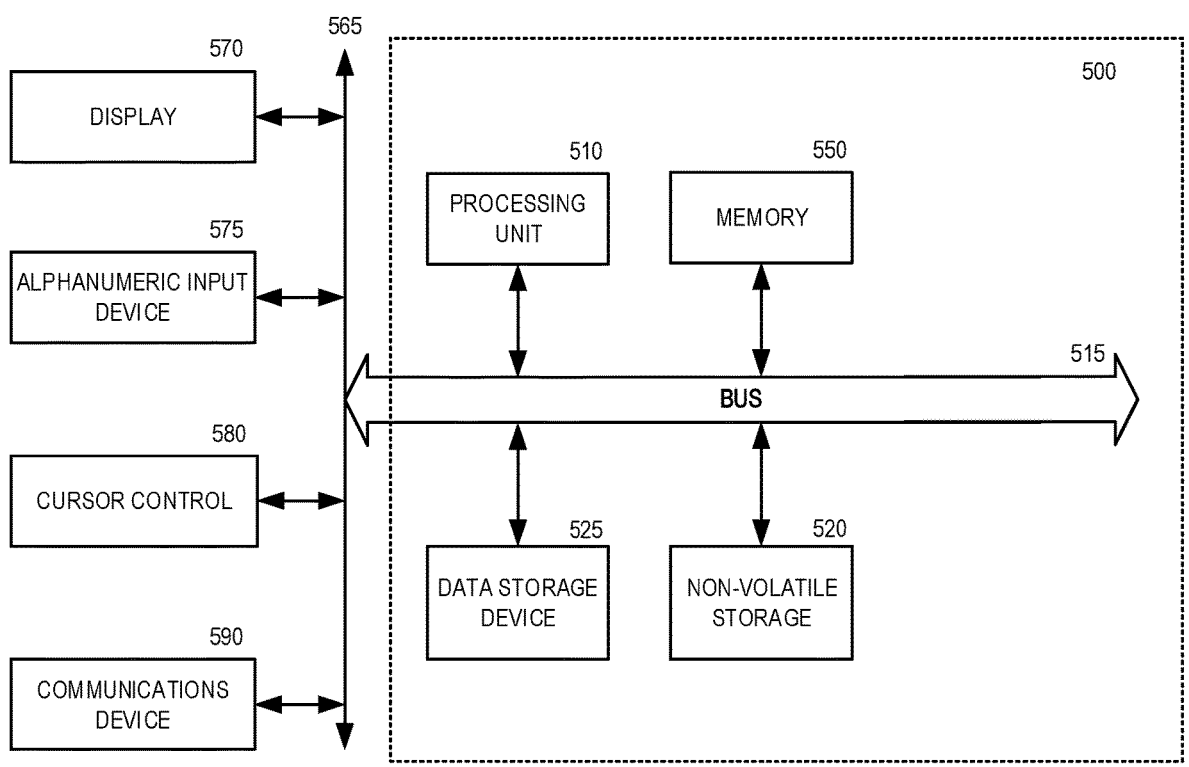
FIG. 5 is one embodiment of a computer system that may be used to support the systems and operations discussed herein.

FIG. 5 is one embodiment of a computer system that may be used to support the systems and operations discussed herein. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for a service provider system providing proof of application ownership of a network distributable application, the method comprising:
   receiving, by the service provider system, a request to approve an application developed by an application developer system, the application identified in the request by an application identifier (ID), wherein the application includes an application programming interface (API) component, a software development kit (SDK) component, or a combination thereof provided by the service provider system to the application developer system for accessing services of the service provider system;
   generating a unique ID for the application to be included within the application, the unique ID associated with the application ID in a data store of the service provider system;
   obtaining, by the service provider system from an application information system, data describing the application;
   extracting an ID from the data obtained from the application information system; and
   in response to determining that the ID extracted from the data matches the unique ID that is associated with the application ID, binding, in an accounts data store, the application with the application ID, the unique ID, and an identifier of the application developer system, and approving the application for interacting with the service provider system.

2. The method of claim 1, wherein the unique ID is a cryptographic nonce generated by the service provider system, and comprises a 16-bit, 32-bit, 64-bit, or 128-bit nonce value.

3. The method of claim 1, wherein the application is distributed to other systems via an online application marketplace.

4. The method of claim 3, wherein the application ID is unique to the application in the online application marketplace.

5. The method of claim 4, further comprising:
   verifying the application developer system is associated with an existing account at the service provider system based at least in part on verification of an account password, an encryption key, or a combination therefor; and
   associating, in the accounts data store, the application ID in the request with the existing account of the application developer system at the service provider system.

6. The method of claim 3, wherein generating the unique ID comprises:
   generating a snippet of code to be included in a manifest file of an application package for the application, the snippet of code comprising a name, value pair to be included in the manifest file prior to the application package being uploaded by the application developer system to the online application marketplace, and wherein the application ID and the unique ID respectively form the name, value pair.

7. The method of claim 6, wherein the obtaining, from the application information system, data describing the application, and extracting the ID from the data obtained by the application information system, further comprises:
   querying, with the application ID, the application information system for an application package associated with the application ID, wherein the application information system obtains the application package associated with the application ID from the online application marketplace when the application is available for download from the online application marketplace;
   receiving, from the application information system, the application package associated with the application ID;
   locating a manifest file in the application package; and
   extracting the unique ID from the snippet of code located in a metadata field in the manifest file of the application package.

8. The method of claim 1, where approving the application for interacting with the service provider system further comprises:
   enabling a transaction between the service provider system and user system executing the application in response to a verification by the service provider system that the application has an application ID and a unique ID matching the application ID and unique ID bound to the identifier of the application developer system within the accounts data store.

9. The method of claim 1, wherein the API component, the SDK component, or the combination thereof are executed by the application to interact with the service provider system during a transaction initiated by the application with a user of the application.

10. The method of claim 1, wherein the application is a mobile device application.

11. A non-transitory computer readable storage medium including instructions that, when executed by a processor, cause the processor to perform operations for providing proof of application ownership of a network distributable application by a service provider system, the operations comprising:

receiving a request to approve an application developed by an application developer system, the application identified in the request by an application identifier (ID), wherein the application includes an application programming interface (API) component, a software development kit (SDK) component, or a combination thereof provided by the service provider system to the application developer system for accessing services of the service provider system;

generating a unique ID for the application to be included within the application, the unique ID associated with the application ID in a data store of the service provider system;

obtaining, from an application information system, data describing the application;

extracting an ID from the data obtained from the application information system; and in response to determining that the ID extracted from the data matches the unique ID that is associated with the application ID, binding, in an accounts data store, the application with the application ID, the unique ID, and an identifier of the application developer system, and approving the application for interacting with the service provider system.

12. The non-transitory computer readable storage medium of claim 11, wherein the unique ID is a cryptographic nonce generated by the service provider system, and comprises a 16-bit, 32-bit, 64-bit, or 128-bit nonce value.

13. The non-transitory computer readable storage medium of claim 11, wherein the application is distributed to other systems via an online application marketplace.

14. The non-transitory computer readable storage medium of claim 13, wherein the application ID is unique to the application in the online application marketplace.

15. The non-transitory computer readable storage medium of claim 14, further comprising:

verifying the application developer system is associated with an existing account at the service provider system based at least in part on verification of an account password, an encryption key, or a combination therefor; and associating, in the accounts data store, they application ID in the request with the account of the application developer system at the service provider system.

16. The non-transitory computer readable storage medium of claim 14, wherein the metadata file is a manifest file of an application package for the application, wherein generating the unique ID comprises:

generating a snippet of code to be included in a manifest file of an application package for the application, the snippet of code comprising a name, value pair to be included in the manifest file prior to the application package being uploaded by the application developer to the online application marketplace, and wherein the application ID and the unique ID respectively form the name, value pair.

17. The non-transitory computer readable storage medium of claim 16, wherein the obtaining, from the application information system, data describing the application, and extracting the ID from the data obtained by the application information system, further comprises:

querying, with the application ID, the application information system for an application package associated with the application ID, wherein the application information system obtains the application package associated with the application ID from the online application marketplace when the application is available for download from the online application marketplace;

receiving, from the application information system, the application package associated with the application ID;

locating a manifest file in the application package; and extracting the unique ID from the snippet of code located in a metadata field in the manifest file of the application package.

18. The non-transitory computer readable storage medium of claim 11, where approving the application for interacting with the service provider system further comprises:

enabling a transaction between the service provider system and user system executing the application in response to a verification by the service provider system that the application has an application ID and a unique ID matching the application ID and unique ID bound to the identifier of the developer system within the accounts data store.

19. The non-transitory computer readable storage medium of claim 11, wherein the API component, the SDK component, or the combination thereof are executed by the application to interact with the service provider system during a transaction initiated by the application with a user of the application.

20. A service provider system that provides proof of application ownership of a network distributable application, the service provider system comprising:

a memory storing one or more instructions; and a processor configured to execute the one or more instructions stored in the memory, which when executed by the processor cause the process to perform operations comprising:

receiving a request to approve an application developed by an application developer system, the application identified in the request by an application identifier (ID), wherein the application includes an application programming interface (API) component, a software development kit (SDK) component, or a combination thereof provided by the service provider system to the application developer system for accessing services of the service provider system, generating a unique ID for the application to be included within the application, the unique ID associated with the application ID in a data store of the service provider system, obtaining, from an application information system, data describing the application, extracting an ID from the data obtained from the application information system, and in response to determining that the ID extracted from the data matches the unique ID that is associated with the application ID, binding, in an accounts data store, the application with the application ID, the unique ID, and an identifier of the application developer system, and approving the application for interacting with the service provider system.

* * * * *